United States Patent
Anikin

(10) Patent No.: US 7,373,810 B2
(45) Date of Patent: May 20, 2008

(54) METHOD AND SYSTEM FOR SHORTENING BRAKE ACTIVATION REACTION TIME

(76) Inventor: Sergey Anikin, 87 Walnut Ave., Atherton, CA (US) 94027

( * ) Notice: Subject to any disclaimer, the term of this patent is extended or adjusted under 35 U.S.C. 154(b) by 119 days.

(21) Appl. No.: 11/515,192

(22) Filed: Sep. 5, 2006

(65) Prior Publication Data

US 2008/0061613 A1   Mar. 13, 2008

(51) Int. Cl.
*G01M 17/00* (2006.01)
(52) U.S. Cl. ........................................ 73/129
(58) Field of Classification Search ............... 73/121, 73/123, 126, 128, 129, 132; 340/438, 453, 340/454
See application file for complete search history.

(56) References Cited

U.S. PATENT DOCUMENTS

| | | | | | |
|---|---|---|---|---|---|
| 4,924,712 | A | * | 5/1990 | Lane | 73/865.4 |
| 5,434,554 | A | * | 7/1995 | Caesar | 340/468 |
| 6,121,896 | A | * | 9/2000 | Rahman | 340/902 |
| 6,170,355 | B1 | | 1/2001 | Fay, III | |
| 7,255,396 | B1 | * | 8/2007 | Anikin | 297/284.9 |
| 2006/0220826 | A1 | * | 10/2006 | Rast | 340/479 |

OTHER PUBLICATIONS

"Survey of Auto Seat Design Recommendations for Improved Comfort" by M. P. Reed, et al. (University of Michigan, Transportation Research Institute, Ann Arbor), 1994.
"Reaction-Time Measurement and Real-Time Data Acquisition for Neuroscientific Experiments in Virtual Environments" by J. Valvoda, et al.. Aachen University (http://www.rz.rwth-aachen.de/vr/papers/MMVRJan2004.pdf).
Reaction Time of Drivers to Road Stimuli, Monash University Human Factors Group—Report HFR-12, *Authors:* T. Triggs & W. Harris,   (http://www.monash.edu.au/muarc/reports/Other/hfr12.html).
Response Time by Charles C. Roberts, Jr. (http://www.croberts.com/respon.htm).
"Follow-Up Test: 2006 Jeep Grand Cherokee SRT8" http://www.edmunds.com/insideline/do/Drives/Followup/articleId=108449.
Tain Electronics Pty, Ltd. (Australia) produces interface units known as "USB Mini CRO Interface", which has two input channels with an input range of 0 to 5 V.

* cited by examiner

*Primary Examiner*—Eric S McCall

(57) ABSTRACT

A system for determining the shortest time needed for a driver to switch the foot from the accelerator pedal to the brake pedal in case of emergency and to push on the brake pedal. When the danger-imitating signal lamp is ignited, preferably, at random, the first photo-receiver receives the light signal and sends it to the signal amplifier, wherefrom the amplified signal is sent to the computer via the time counter. The computer begins to register the length of the light signal. As soon as the driver reacts to the light signal of the signal lamp, he or she moves his or her foot from the accelerator pedal to the brake pedal and pushes on the brake pedal, thus igniting the brake lights. Thus, the time interval between the moment of initiation of the first photo-receiver and the initiation of the second photo-receiver corresponds to the time of the driver's response to the light signal that imitates a danger plus time of transfer from the accelerator pedal to the brake pedal. The above-described test is repeated several times at different positions of the under-thigh support to find the position most optimal for the shortest braking time.

16 Claims, 9 Drawing Sheets

METHOD AND SYSTEM FOR SHORTENING BRAKE ACTIVATION REACTION TIME

CROSS-REFERENCES TO RELATED APPLICATIONS

The present patent application is related to pending U.S. patent application Ser. No. 11/509,376 filed by Sergey Anikin on Aug. 24, 2006 and is entitled "Device for Shortening Brake Activation Reaction Time".

FIELD OF THE INVENTION

The present invention relates to ergonomics, in particular to ergonomics of a vehicle driver as a biomechanical system. More specifically, the invention relates to a method and system for shortening brake activation reaction time. In particular, the invention concerns a method and system for finding a position for an under-thigh support that provides the shortest brake activation reaction time. The aforementioned under-thigh support is intended for use by a vehicle driver for supporting and securing the right leg in the position from which the foot of the driver can be turned from the accelerator pedal to the brake pedal in the shortest possible time. The method and system of the invention makes it possible to adjust the position of the under-thigh support individually for each person in the driver's seat.

BACKGROUND OF THE INVENTION

Car crashes now claim more than 40,000 lives each year in the United States, a number that has slowly declined from about 50,000 per year over the last four decades. Automobile crashes are the leading cause of death among people 1 to 34 years of age, accounting for 3.4 million nonfatal injuries annually and costing an estimated $200 billion. Rates of automobile fatalities and injuries per driver and per mile driven have decreased substantially because of safer cars and roads, laws that discourage drunk driving, and other measures, but the absolute toll of automobile crashes remains high.

By the year 2025 there will be 33 million people 70 years or older in America. This segment of the population will be growing 2.5 times as fast as the total population. These senior citizens will make up the largest percentage of "slow reaction" accidents. Slowly but surely senior citizens have developed a higher accident ratio than teenagers. And also, by 2025, total costs for motor vehicle accidents in the United States will exceed 450 billion dollars. Heretofore many studies have been conducted to improve the ergonomics of a vehicle seat. For example, "Survey of Auto Seat Design Recommendations for Improved Comfort" by M. P. Reed, et al., (University of Michigan, Transportation Research Institute, Ann Arbor), 1994 contains a review of a large body of literature with emphasis on fit parameters related to anthropometric measurements, feel parameters, including pressure distribution and vapor permeability, and support parameters defined with respect to the seat posture. Particular attention is given to appropriate lumbar support.

Other studies aimed at measuring the reaction time of the driver in case of dangerous situations can be found in the following publications and Internet materials: 1) "Reaction-Time Measurement and Real-Time Data Acquisition for Neuroscientific Experiments in Virtual Environments" by J. Valvoda, et al., Aachen University (http://www.rz.rwth-aachen.de/vr/papers/MMVRJan2004.pdf); 2) Reaction Time of Drivers to Road Stimuli, Monash University Human Factors Group—Report HFR-12, Authors: T. Triggs & W. Harris, (http://www.monash.edu.au/muarc/reports/Other/hfr12.html); and 3) How the Driver Reaction Meter Works (http://www.sibtec.com/driverhowitworks.html).

U.S. Pat. No. 6,170,355 issued in 2001 to W. Fay, III discloses an easily adjustable foot-operated pedal assembly, such as a brake pedal for use in heavy equipment that can be placed in multiple positions to accommodate people of differing heights and body shapes.

The necessity for a raised under-thigh support] is mentioned in many advertisements for modern cars. For example, in "Nissan 350Z GT-MotorBar Road Test" it is stated that "a raised bolster in the middle of the seat cushion helps give extra under-thigh support for more precise operation of the pedal". In the pamphlet entitled "Follow-Up Test: 2006 Jeep Grand Cherokee SRT8" it is stated that "the long-haul comfort is commendable too, with excellent under-thigh support and feeling of the seats wrapping around".

Investigations show that the total stopping distance of a vehicle is made up of four components: human perception time; human reaction time; vehicle reaction time; and vehicle braking capability.

Human perception time is the time it takes a driver to see a hazard and the brain to realize that it is a hazard requiring immediate reaction. This component of stopping distance is human factors and as such can be affected by age, tiredness, alcohol, and concentration levels. Once the brain realizes danger, the human reaction time is the time it takes to move the foot from the accelerator to the break pedal and then to depress the pedal. The movement time from the accelerator to the brake is approximately 500 ms (according to the University of Iowa).

Heretofore many studies have been conducted in order to determine the response time for pressing the brake pedal. For example, an article "Response Time" by Charles C. Roberts, Jr. (http://www.croberts.com/respon.htm) describes a test apparatus that evaluates this reaction time. As soon as the light turns red on the console, the driver releases the accelerator and applies the brake. The reaction time is measured. This form of testing is often called "simple reaction time" because it is a result of a single stimulus, the red light. Reaction times are typically on the order of ¾ of a second. However, response times are more complex and can be as high as 3 to 4 seconds because response time consists of perception/decision time plus reaction time. The perception/decision time is the time it takes to view a hazard and to decide what to do about it. The reaction time is the time it takes to perform a particular function once a decision is made. The response time for removing one's hand from a hot skillet is relatively quick and is on the order of about a half second. In this example, a natural response to excessive heat bypasses visual sensors, allowing for a quicker response time. Driving an automobile requires a high degree of visual processing, which tends to extend response times. What can be gleaned from the discussions in the article is that response time is a distributed quantity because of variability in people as well as in situations that require a response. The accident reconstruction community often assumes a maximum 2.5- to 3.0-second response time. This may apply to most accidents with obvious hazards. Other accidents involving less defined or confusing hazards may result in longer response times. Other factors extending response time are age, time of day, gender, and chemical usage, suggesting that response time is typically characteristic of a particular set of circumstances encountered in an accident.

There are many other studies of response times and their usage, but none of these studies takes into account the effect of finding the most optimal physical position for the driver's leg relative to the accelerator and brake pedal.

When driving a vehicle, the driver's leg that controls the accelerator and brake pedal can be considered a biomechanical system, the model of which is shown in FIG. 1. In the context of the present invention, the part of the leg from the fulcrum point H of the heel on the vehicle floor to the knee joint KN is referred to as "leg" L; the part of the driver's leg from the point H to the point T1 of contact with the accelerator pedal 20 is referred to as "foot" FT; and the part of the driver's leg from the point KN to the pelvic floor joint PF, which is considered the a fulcrum point on the vehicle seat 22, is referred to as "thigh" TH.

FIG. 2 is a view of the driver's right leg in the direction of arrow A in FIG. 1. Two planes must be considered for analysis of the movement in which the driver's leg participates. The first plane is a plane I-I that is slightly inclined with respect to the vertical plane V-V and passes through the thigh TH and leg L, i.e., the plane that passes through the joints PF, KN, and H' (where H' is a heel joint (FIGS. 1 and 2). The plane I-I corresponds to the unrestrained position of the leg during normal driving with the foot PT on the accelerator pedal 20. The second plane is plane II-II which passes through the same joints when the foot FT is on the brake pedal 24. The position of the leg in plane II-II is shown by broken lines.

Let us consider movements of the driver's leg during when one drives a car with an automatic gear box wherein two pedals, i.e., the accelerator pedal and the brake pedal, are used to control the car. Although in reality, these movements are more complicated, in a simplified form they can be considered as the following two modes.

In the first mode, let us assume that for the initial position of the leg, the foot FT is on the accelerator pedal 20. When braking is needed, the driver with relatively short legs first slightly raises the foot FT from the floor F so that the heel is disconnected from point H and the leg is shifted sidewise to the brake pedal 24. In this movement the entire leg is raised relative to the point PF as a fulcrum. The driver then turns the entire leg relative to the plane I-I to the plane II-II and moves the leg down in order to press on the brake pedal 24.

In the second mode, which is more typical for a driver with relatively long legs, in order to brake from the position on the accelerator pedal 20, the driver merely turns the foot FT relative to the point H.

In reality, the aforementioned movements are more complicated and may comprise a combination of both movements simultaneously. In the context of the present patent application, the movement of the foot from the accelerator pedal to the brake pedal also includes the movement of pushing on the brake pedal until actual initiation of the brakes, i.e., to the moment when the brake lights are ignited.

It is important to consider the aforementioned movements with regard to the time of braking. It has been experimentally proven by the inventor that when a human being accomplishes braking movements on the basis of subconscious reflexes, the aforementioned movements are not at all optional. In other words, there exists a certain unnatural position of the pedal-controlling leg that can provide a more optimal breaking condition, i.e., the condition that allows shortening of the braking time and hence of the braking path.

To provide the most optimal position of a driver's right leg in order to shorten the momentum for movement of the feet from the accelerator pedal to the brake pedal and to subsequently press the brake pedal, the inventor herein developed a special under-thigh pillow that can be used for supporting and fixing the driver's right leg in the aforementioned optimal position.

The aforementioned under-thigh pillow is a subject of pending U.S. patent application Ser. No. 11/509,376 which was filed by the same applicant on Aug. 24, 2006 and which is incorporated herein by reference.

The use of the aforementioned under-thigh support is justified only if the aforementioned under-thigh support is installed and fixed in a predetermined position that depends on specific anthropometric data of each individual driver. In other words, the most optimal position of the under-thigh support of the aforementioned patent application will be different for people of different builds.

SUMMARY OF THE INVENTION

It is an object of the invention to provide a method and system for determining such a position for the vehicle-controlling leg of a specific driver in a specific driver's seat, which is the most optimal for providing the shortest time of movement of the driver's foot from the accelerator's pedal to the brake pedal. It is another object to provide the aforementioned system in the form of a small and compact package that is composed of commercially available units and can be conveniently stored in a trunk of a car or elsewhere as a kit. It is a further object to provide the aforementioned system that makes it possible for a driver to test his or her response time while sitting in the driver's seat of his or her vehicle and to securely adjust the under-thigh pillow in the position that provides the shortest time to move the foot from the accelerator pedal to the brake pedal.

In general, the system of the invention comprises a kit that consists of an under-thigh support, a signal lamp with a feed battery, a knob for igniting the signal lamp, two photo-receivers, a signal amplifier with a power supply battery, a time counter, and a recording device, e.g., a laptop computer. For assembling the system into the operative condition for finding the most optimal position for the under-thigh pillow, the signal lamp is installed in the vision field of the driver who sits in the driver's seat of his or her vehicle; one photo-receiver is installed on a vehicle or in another place visible to the driver so as to receive the light signal from the signal lamp; another photo-receiver is installed in front of a brake light on the rear of the vehicle; and both photo-receivers are connected to the registration device, e.g., to a laptop computer, through a time counter to which both photo-receivers are connected simultaneously, e.g., via two USB ports. The driver assumes a position in the driver's seat of his/her vehicle, places the under-thigh support, which is made, e.g., in the form of a triangular pillow, and waits for a light from the signal lamp. To imitate real conditions, the light should be ignited at random so that the driver does not expect it at regular intervals. When another person or an automatic device, such as, e.g., a random-number generator, activates the knob to ignite the signal lamp, the first photo-receiver receives the light signal and sends it to the signal amplifier, wherefrom the amplified signal is sent to the computer via the time counter. The computer begins to register the length of the light signal. As soon as the driver reacts to the light signal of the signal lamp, he or she moves his or her foot from the accelerator pedal to the brake pedal and pushes on the brake pedal, thus igniting the brake lights. When the second photo-receiver detects the light signal from the brake light, the time counter immediately discontinues counting the signal obtained from the first photo-receiver.

Thus, the time interval between the moment of initiation of the first photo-receiver and the initiation of the second photo-receiver corresponds to the time of the driver's response to the light signal that imitates a danger plus time of transfer from the accelerator pedal to the brake pedal. The above-described test is repeated several times at different positions of the under-thigh support. Each time the driver marks the position of the under-thigh support. Then the results of the measurements are compared, and the under-thigh support is fixed in the position that corresponds to the shortest time interval between the light signal and ignition of the brake light.

DETAILED DESCRIPTION OF THE INVENTION

Figure 1:
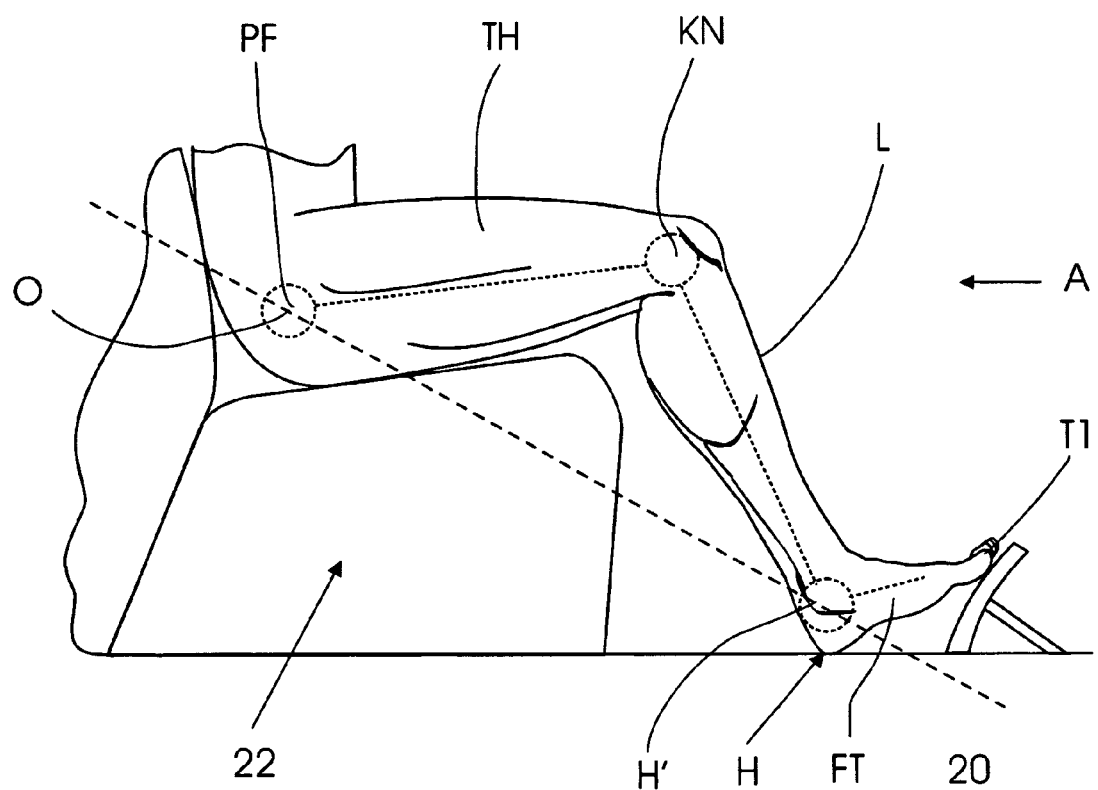
FIG. 1 is a side view of the driver's leg as a biomechanical system.
Figure 2:
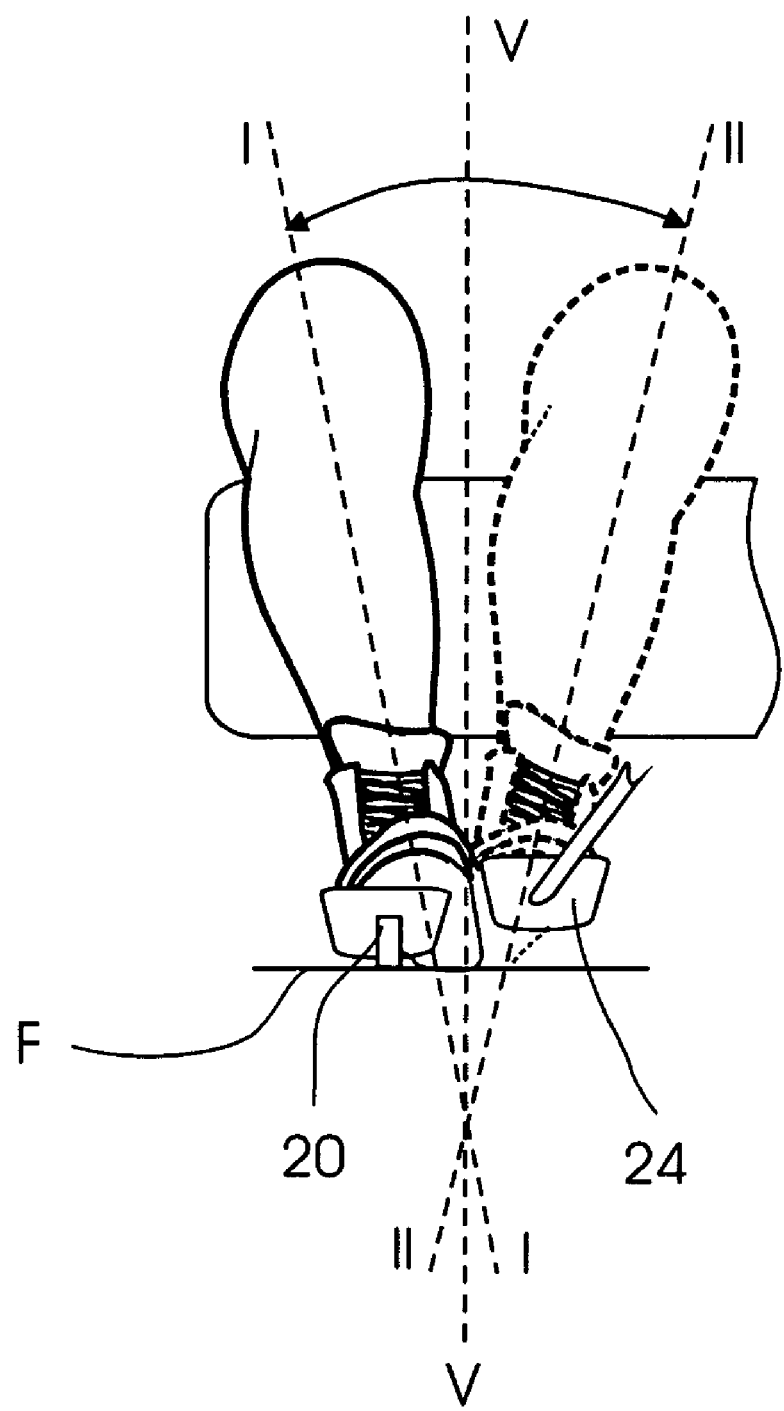
FIG. 2 is a view in the direction of arrow A in FIG. 1.
Figure 3:
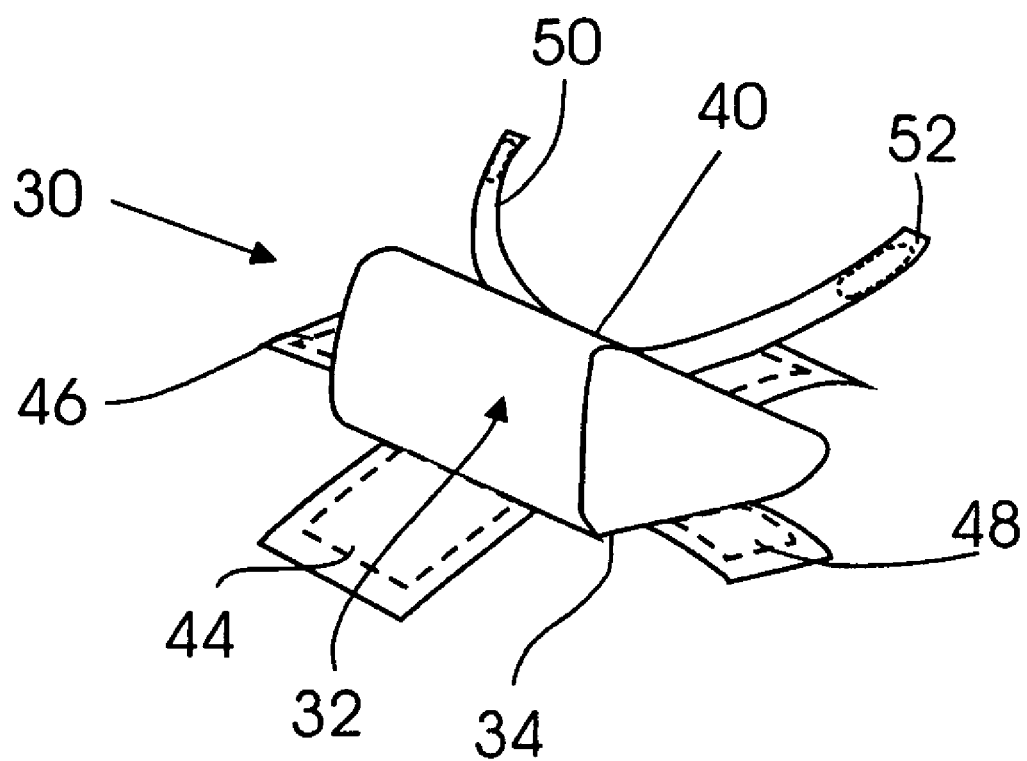
FIG. 3 is a three-dimensional view of an under-thigh pillow in accordance with one embodiment of the invention.

To better understand the method and system of the invention, it would be advantageous first to recognize that the under-thigh support must be placed and secured in the most optimal position on the cushion of the driver's seat and that this can be done by using the system of the invention. A three-dimensional view of the under-thigh support according to one embodiment of pending U.S. patent application Ser. No. 11/509,376 is shown in FIG. 3. It can be seen that this device comprises an under-thigh support pillow 30 that is intended for use in combination with a seat cushion of the car seat (not shown in FIG. 3) in order to support the driver's leg and preferably to restrain the driver's leg in a position most optimal for shortening brake activation reaction time.

A pillow body 32 has a flat contact surface 34 that during use is maintained in contact with the surface of the seat cushion 36 (shown in FIG. 4 and which is a three-dimensional view of a car seat 38) and an upper thigh-supporting surface 40, which in the working position of the device, is tapered in the direction from the edge 42 (FIG. 4) of the seat cushion 36 toward the driver (not shown) and is used for supporting the driver's thigh and hence the driver's leg in the position required for minimal time of braking.

Figure 4:
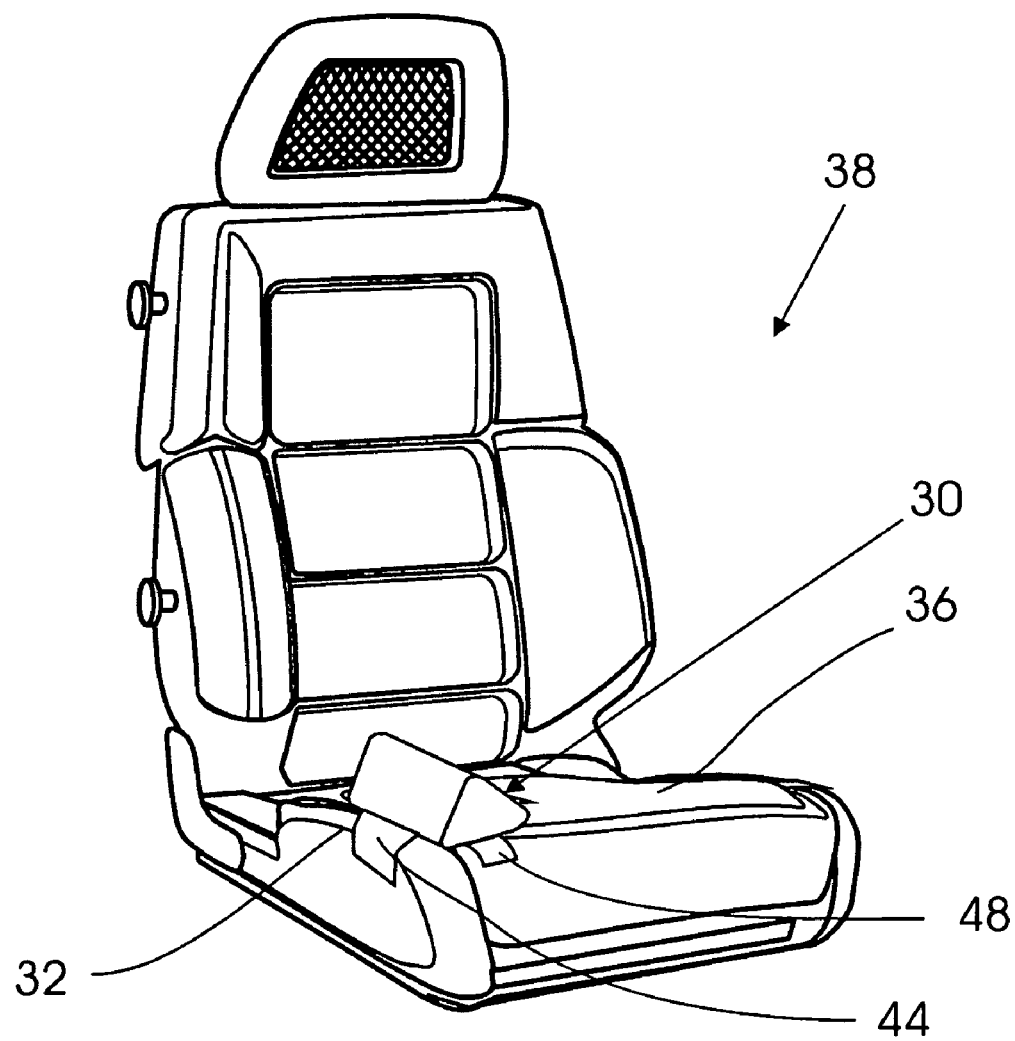
FIG. 4 is a three-dimensional view of the under-thigh support pillow of FIG. 3 installed in a working position on the car seat cushion without the use of restraining strips.

In the embodiment of FIGS. 3 and 4, means for securing the thigh-supporting pillow 30 to the seat cushion are made in the form of friction strips 44, 46, and 48. These strips comprise hook-and-loop type fasteners which are commercially available under the trademark Velcro (hereinafter referred to as Velcro fasteners). Such fasteners are suitable for securing the pillow body 30 only when the car seat cushion is made from a material with a high coefficient of friction such as a rough fabric, which is engageable with the Velcro fasteners. A pair of Velcro straps 50 and 52 with mutually engageable surfaces on their ends is intended for wrapping around the driver's thigh in order to fix it in the aforementioned optimal thigh-supporting position.

It is understood that the strips 44, 46, and 48 are not suitable for a seat cushion covered by leather or a similar material with a low coefficient of friction. In order to use the under-thigh pillow 32 on leather seats, the triangular pillow can be used in combination with a seat cushion case 54 of the type shown in FIG. 5. The seat cushion case 54 can be made from a material easily engageable with the Velcro strip 56, or a Velcro strip 56 can be permanently attached to the area of the seat pillow case that corresponds to the position of the pillow 30. The seat cushion case 54 may have back straps 58 and 60 that go behind the seat cushion 36 for securing the seat cushion case 54, and the ends of the back straps can be tightened and tied, e.g., by Velcro fasteners 58a and 60a or by snaps, etc. The lower edge of the cushion case 54 may be trimmed with a rubber cord 62 for securing the lower end of the cushion case 54 on the seat and for tightly embracing the surface of the entire seat cushion with the material of the cushion case 54.

According to another embodiment, the under-thigh support pillow can be built into the structure of the car seat to raise the pillow to the working position by mechanical means.

Figure 6:
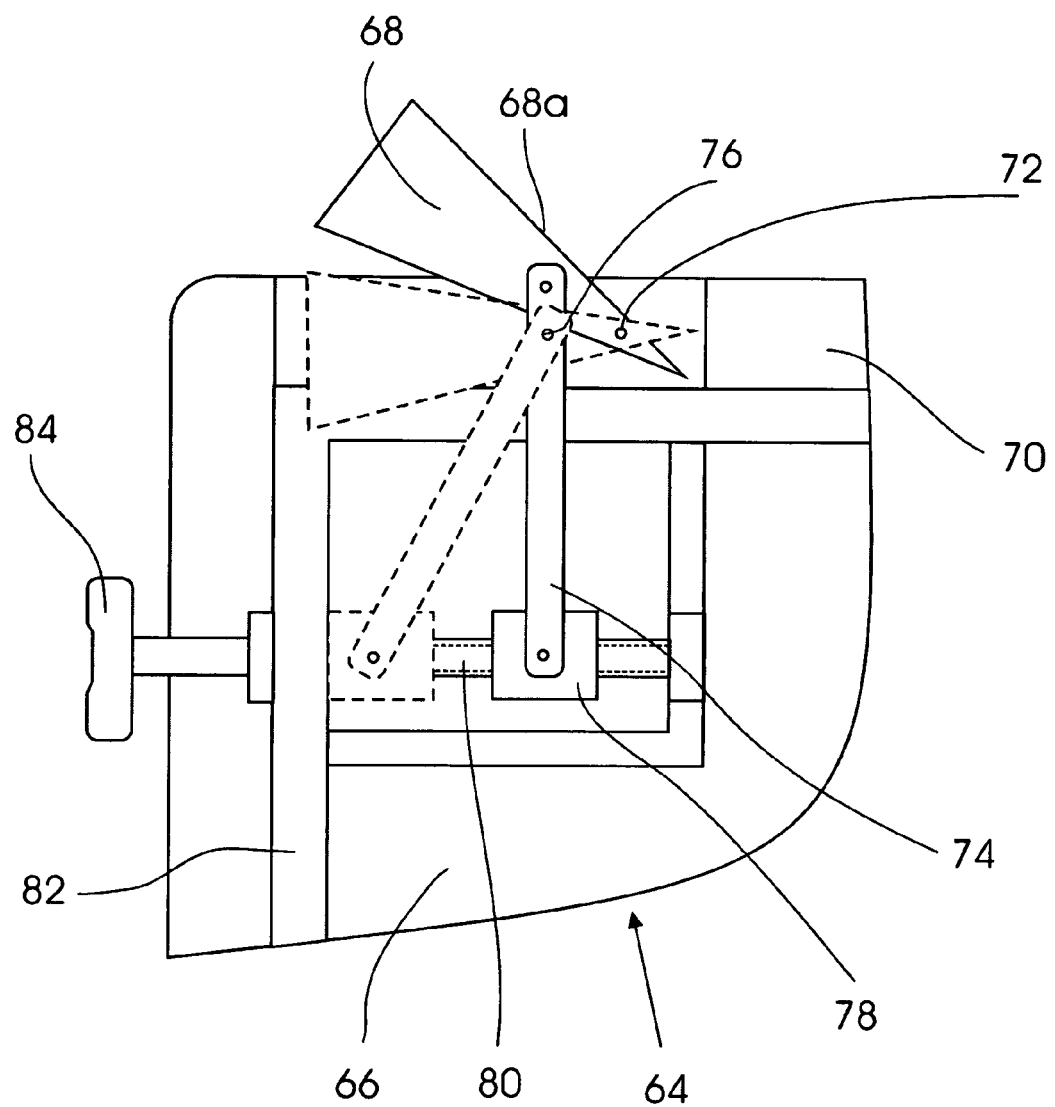
FIG. 6 is a sectional view of the car seat with a built-in under-thigh support pillow of the invention and with a mechanism of the invention for adjusting positions of the under-thigh support pillow.

For example, a simple mechanism 64 shown in FIG. 6 in a cross-sectional view of the car seat 66 can be used for shifting an under-thigh support pillow 68 between the position withdrawn into the seat cushion 70 shown in FIG. 6 by solid lines and the raised position of the pillow 68 shown in FIG. 6 by broken lines. In this embodiment, the upper surface 68a of the pillow 68 faces outward and is maintained substantially in the plane of the seat cushion 70 when the pillow 68 is in the withdrawn position. The pillow 68 may have any appropriate shape but preferably should have a triangular cross section where in the withdrawn position of the pillow the aforementioned upper surface 68a of the pillow 68 functions as a support surface for the thigh. The pillow is pivotally supported on an axle 72 that is installed in the innermost apex of the triangular cross section of the pillow so that the pillow 68 can be raised and lowered by rotating on the axle 72. These rotary motions are carried out with the use of a mechanism formed by a link 74, one end of which is pivotally attached to the pillow 68 by means of a pin 76, while the other end thereof is pivotally attached to a nut 78. The latter engages a screw 80, which is rotatingly supported in the frame 82 of the car seat 66. The outer end of the screw that projects from the car seat supports a handle or a knob 84 located in a position easily reachable by the driver's hand.

Figure 5:
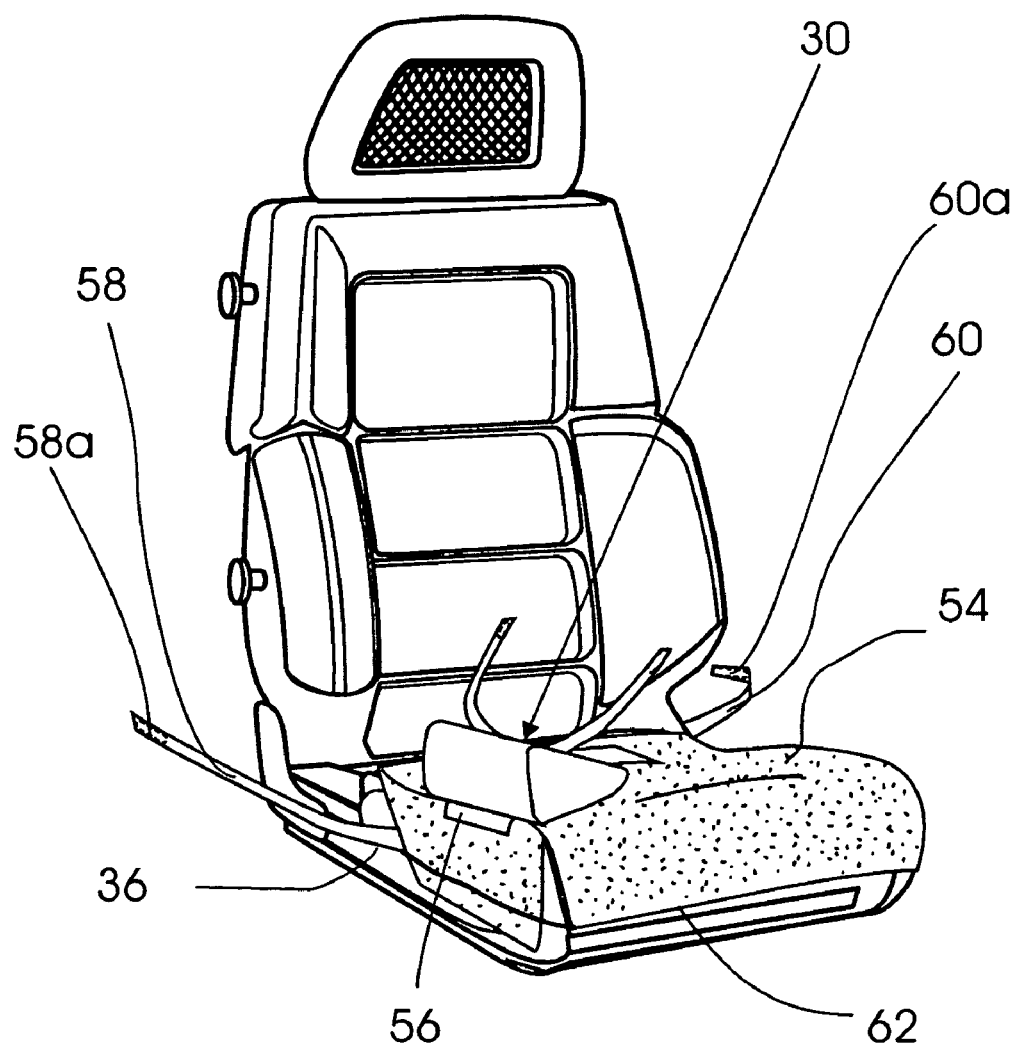
FIG. 5 is a three-dimensional view of the under-thigh support pillow of FIG. 3 installed in a working position on the car seat cushion with the use of a car seat cushion case.

By rotating the knob 84, it is possible to raise the under-thigh pillow 68 from the position shown in FIG. 5 by solid lines to the position shown by broken lines.

The pillow may have any suitable shape provided that the upper surface thereof can be arranged at an angle to the upper surface of the seat cushion tapering down from the door side to the central part of the seat cushion. The interior of the under-thigh support pillow can be stuffed with a sponged plastic or fabric, or the pillow may have an inflatable structure. The pillow body may be stuffed with the same foam plastic that is used for filling conventional car seat cushions.

The outer surface of the pillow of the invention is coated with a non-slip material, such as, e.g., one known under the trademark "Snugtex" (NFA Corporation, MA) which works on all sorts of fabric and leather materials without slippage even when a person is driving without the use of Velcro-type strips.

Having described the under-thigh support, let us now consider in detail the system and method of the invention which are intended for positioning the under-thigh support in the most optimal position for shortening the brake activation response time.

Figure 7:
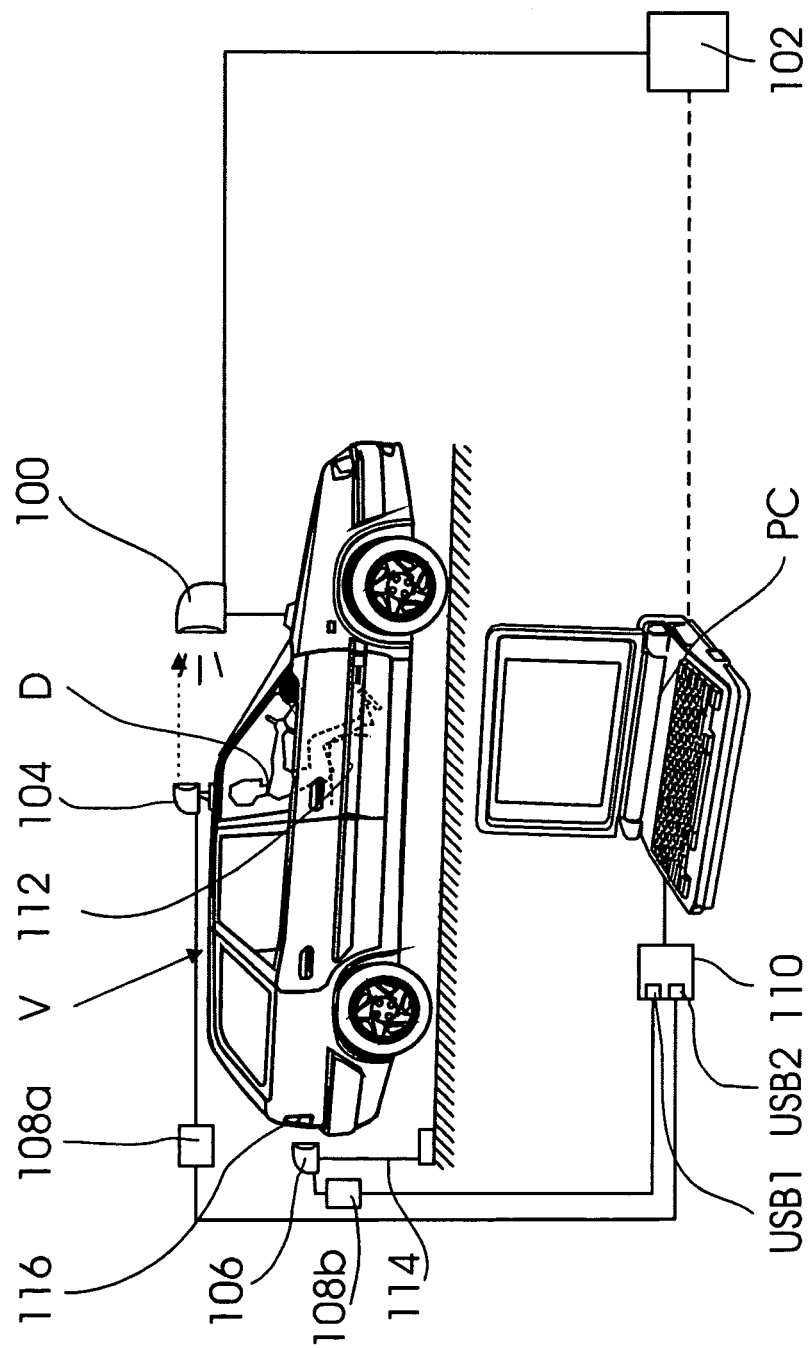
FIG. 7 is a schematic view of the system of the invention that illustrates the method of the invention and principle of operation of the system.

A general schematic view of the system of the invention is shown in FIG. 7. The system comprises a kit that consists of danger-imitation means, e.g., in the form of a signal lamp 100 with a feed battery (not shown), a signal lamp ignition device 102, e.g., a manually controlled knob for igniting the signal lamp 100, a first photo-receiver 104, a second photo-receiver 106, signal amplifiers 108a and 108b with power supply batteries (not shown), a time counter 110, and a recording device, e.g., a computer PC such as a laptop or palm computer.

To assemble the system into the working condition shown in FIG. 7 for adjusting and securing in place the under-thigh support of the type shown in FIGS. 1 to 5, the signal light lamp 100 is installed in a position visible by the driver D from the driver's seat 112 of his or her vehicle V. The lamp 100 should be sufficiently powerful for the driver to see the light emitted by this lamp during a sunny day. So that the photo-receiver can detect the light signal as well, it is recommended to use a lamp that emits a colored light such as a red light of a predetermined wavelength for reception of which the photo-receiver 104 is tuned, e.g., by using an appropriate filter (not shown). It is recommended to install the signal lamp 100 approximately on the same vertical level as the photo-receiver 104 in order to provide the shortest distance between the aforementioned light-emitting and light-receiving elements of the system.

The signal lamp is electrically connected to a signal light ignition device 102 that may comprise a manual knob or a push button, and preferably may comprise a random-number generator, e.g., in the form of a Multifunctional Relay Switch of Electronics123.com, Inc., Columbiana, Ohio, USA. This device has 14 different functions, including timers, switching, flashing, random switching, etc. It contains two pre-programmed delays, learning mode for delays of 2 sec up to 12 days, a pushbutton control, and an EEPROM for delay-time storage in case of power failure. The device is suitable for control of incandescent lighting, halogen lighting, fluorescent lighting, fans, valves, buzzers, etc. If necessary, the function of the random-number generator may be accomplished by the computer PC.

The photo-receiver 106 is then installed on a stand 114 just behind the brake signal light 116 on the rear side of the vehicle V. The photo-receivers 104 and 106 are connected to the respective USB ports USB2 and USB1 of the time counter 110 via respective signal amplifiers 108a and 108b. It is understood that the signals sent from the photo-receivers 104 and 106 via the optical signal amplifiers are received and counted by the time counter 110 in the form of clock signals. The counting system has a very high resolution, e.g., in tens of msec since the photo-receivers are tuned for triggering in response to the leading front of the wavefront of the light signal emitted from the signal lamp 100.

The time counter can be represented by any of interface units produced by Tain Electronics Pty, Ltd. (Australia), "USB Mini CRO Interface" which has two input channels with an input range of 0 to 5 V. The sampling rate is up to 20,000 samples per second. Power is supplied via a USB cable.

Determining the most optimal position for the under-thigh support of the type described above and shown in FIGS. 3 to 5 is carried out as follows.

The driver D assumes a position in the driver's seat 112 of his or her vehicle V, places the under-thigh support of the type shown in FIGS. 3 to 5 (not shown in FIG. 7) under his or her right thigh, and waits for ignition of the light from the signal lamp 100. To imitate real conditions, the lamp 100 may be ignited at random either manually through the lamp ignition device 102, e.g., a knob, or through a random-number generator.

Figure 8:
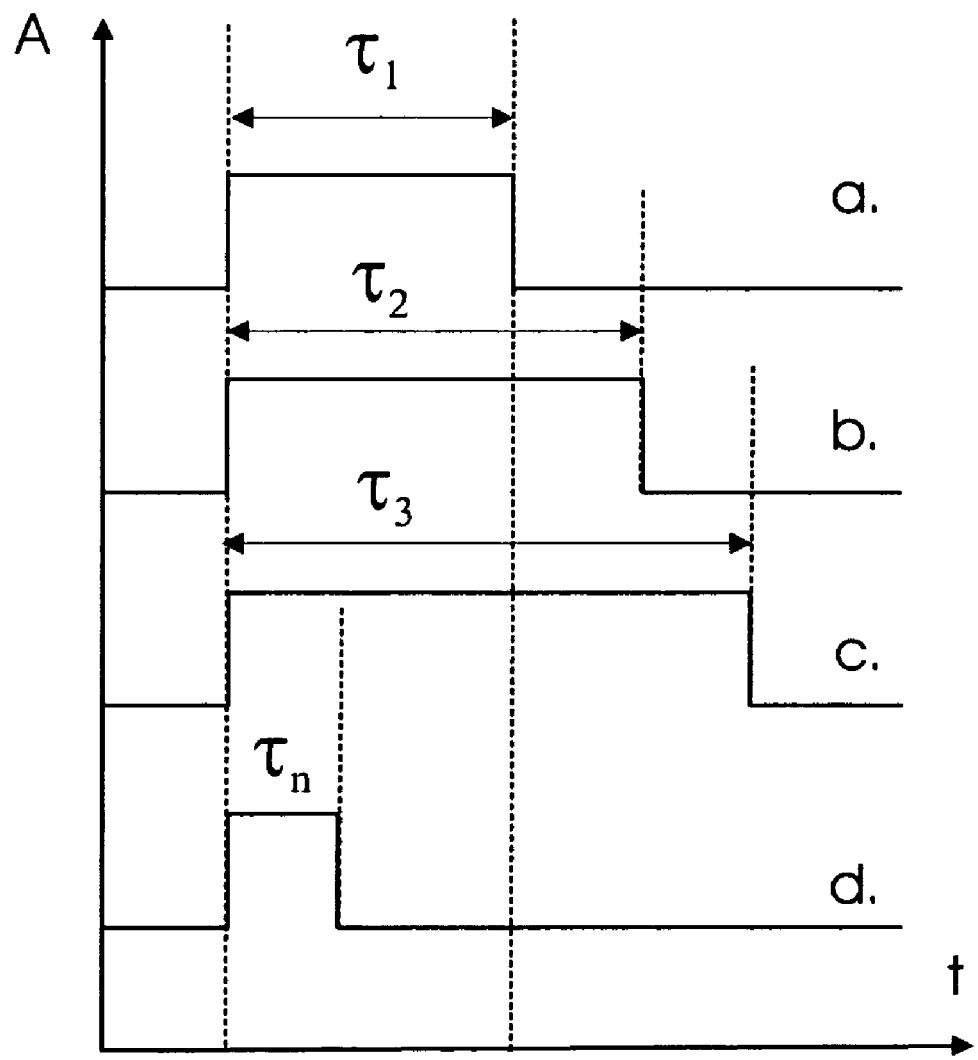
FIG. 8 is a diagram that shows an example of registration from the time of generation of the danger-imitation signal to ignition of the brake light.

When the signal lamp 100 is ignited, the leading wavefront of the light signal triggers the first photo-receiver 104, which converts an optical signal into electrical signals, and the electrical signals are then sent to the signal amplifier 108a where the signals are amplified and wherefrom the amplified clocked electrical signals are sent to the computer PC via the time counter 110. The computer PC begins to register the length of the light signal. As soon as the driver D reacts to the light signal of the signal lamp 100, he or she moves his or her foot FT (FIG. 1) from the accelerator pedal 20 to the brake pedal 24 (FIG. 2) and pushes on the brake pedal 24, thus igniting the brake light 116. When the second photo-receiver 106 detects the light signal from the brake light 116, the time counter 110 immediately discontinues counting the signal obtained from the first photo-receiver 104. This fact is registered on the computer PC, e.g., in the form of the diagram (a) in FIG. 8, where duration of the aforementioned time signal is registered as $\tau_1$. Thus, the time interval $\tau_1$ between the moment of initiation of the first photo-receiver and the initiation of the second photo-receiver corresponds to the time of the driver's response to the light signal that in the first test with the use of an under-thigh support imitates a danger plus time of transfer from the accelerator pedal to the brake pedal. The above-described test is repeated several times at different positions of the under-thigh support. Each change in position of the under-thigh support will produce a new duration of the driver's response plus activation of the brakes, and, hence, to a new duration of the light signal. This is shown in FIG. 8 by time intervals $\tau_1$, $\tau_2$ (FIG. 8(b)), $\tau_3$ (FIG. 8(c)), $\tau_n$ (FIG. 8(d)), etc. Time signals measured in the same positions of the driver but without the use of the under-thigh support appeared to be longer.

In each new test, the driver D marks the position of the under-thigh support. Then the results of measurements are compared, and the under-thigh support is fixed in the position that corresponds to the shortest time interval $\tau_n$, between the light signal and ignition of the brake light.

Figure 9:
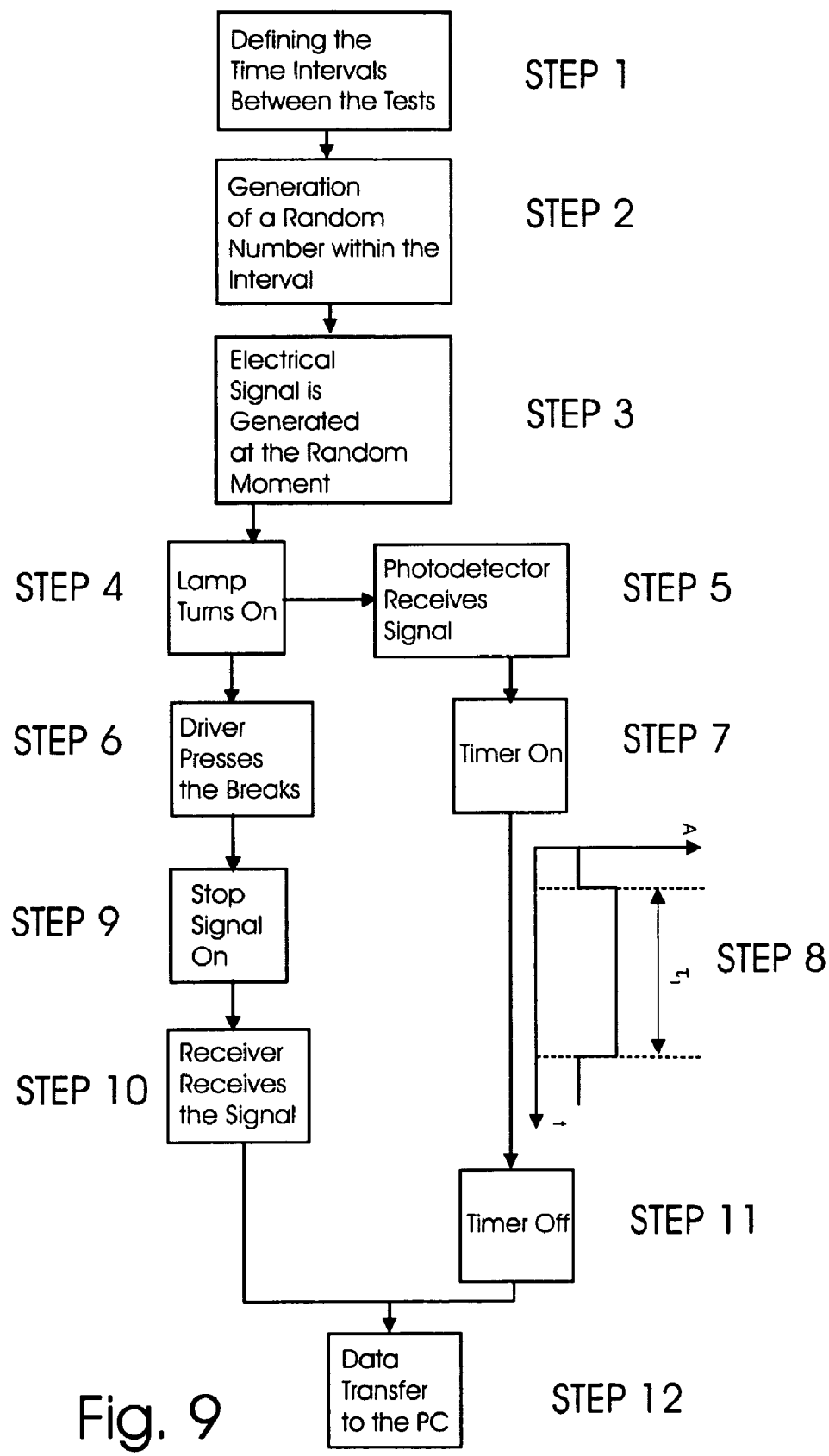
FIG. 9 is a flow chart that shows the sequence of steps that occurs when the signal light is generated by a command of a random-number generator.

If ignition of the signal lamp 100 is performed from a lamp ignition device 102 in the form of a random-number generator of the type mentioned above as a Multifunctional Relay Switch, the operation is carried out in a manner illustrated by the flow chart shown in FIG. 9. This drawing is a flow chart that shows the sequence of steps that occurs when the signal light is generated by a command of a random-number generator.

First, a time interval during which the lamp 100 has to be ignited in a random manner is defined (Step 1). For example, it is decided that the driver obtains a light signal at any moment within 2 minutes, i.e., 120 sec. When the Multifunctional Relay Switch generates a random number (Step 2), the switch generates an electrical signal (*Step 3) that turns on the lamp 100 (Step.4). The light emitted by the lamp is noticed by the driver D as a danger signal and, at the same time, it is detected by the first photo-receiver 104 (Step 5). The driver pushes on the brake pedal (Step 6). The photo-receiver 104 almost immediately and in advance of the driver's reaction switches on the timer 110 (Step 7), and the timer transmits the signal to the registration apparatus, e.g., computer PC for recording time signal duration (Step 8). When the driver pushes on the brake and the brake light is activated (Step 9), the second photo-receiver 106 detects the ignition of the brake light 116 (Step 10). This automatically switches off the timer 110 (Step 11), and the switch-off signal is transmitted to the computer PC for recording (Step 12).

Thus, it has been shown that the invention provides a method and system for determining the most optimal position for the vehicle-controlling leg of a specific driver in a specific driver's seat in order to provide the shortest time of movement of the driver's foot from the accelerator's pedal to the brake pedal. The invention provides the aforementioned system in the form of a small and compact package that is composed of commercially available units and can be conveniently stored in a trunk of a car or elsewhere as a kit. The aforementioned system makes it possible for a driver to test his or her response time while sitting in the driver's seat of his or her vehicle and to adjust and to secure the under-thigh pillow in the position that provides the shortest time for moving the foot from the accelerator pedal to the brake pedal.

Although the invention has been shown and described with reference to specific embodiments, it is understood that these embodiments should not be construed as limiting the areas of application of the invention and that any changes and modifications are possible provided that these changes and modifications do not depart from the scope of the attached patent claims. For example, the danger-imitation signal may be in the form of a sound signal, a combination of a visible and a sound signal, in the form of an object that unexpectedly appears in front of the windshield, etc. The reaction time may be recorded by the timer and then analyzed in a shared-time mode on a computer in a remote location. It is not necessary to switch the first signal when the second is generated, and signals of the signal lamp may remain ignited when the brake light signal is recorded. The signals can be wirelessly transferred from the sensors to the timer and to the computer. The principle of the invention also applies to vehicles in which the driver sits on the left.

The invention claimed is:

1. A system for shortening brake activation reaction time for a driver of a vehicle wherein the accelerator pedal and the brake pedal are controlled by the foot of the driver who sits in the driver's seat on a seat cushion, said vehicle having at least one brake light on the rear side of said vehicle, said system comprising:
   an under-thigh support for the driver's leg having means for preventing sliding of said under-thigh support on the surface of said driver's seat and having a support surface that is raised above the surface of said cushion and is tapered in the direction from the right thigh of the driver toward the center of said driver's seat cushion for supporting the driver's thigh in a position that provides the shortest reaction time for movement of the driver's leg from the accelerator pedal to the brake pedal and for activation of the brake;
   danger-imitation means that generates a danger-imitation signal perceived by said driver in said position;
   a device for randomly activating said danger-imitation means;
   a first sensor that is sensitive to said danger-imitation signal and that generates a first electrical signal in response to said danger-imitation signal;
   a second sensor that is installed behind said vehicle for sensing the ignition of the brake light that is ignited when the driver presses on said brake pedal;
   a switching device that is connected to said first sensor and to said second sensor and that counts the duration of said first electrical signal and switches off said first sensor simultaneously during switching on of said second sensor; and
   a signal-duration registration device that is connected to said switching device for registering the duration of said first electrical signal.

2. The system of claim 1, wherein said danger-imitation means is a signal lamp that emits a light signal visible by the driver in said position, said first sensor is a first photo-receiver, and said second sensor is a second photo-receiver.

3. The system of claim 2, further provided with a first electric signal amplifier connected between said first photo-receiver and said switching device, and a second electric signal amplifier connected between said second photo-receiver and said switching device.

4. The system of claim 1, wherein said signal-duration registration device is a computer.

5. The system of claim 2, wherein said signal-duration registration device is a computer.

6. The system of claim 3, wherein said signal-duration registration device is a computer.

7. The system of claim 3, wherein said signal-duration registration device comprises a time counter having at least two USB ports for connection to said first photo-receiver through said first electric signal amplifier and to said second photo-receiver through said second electric signal amplifier.

8. The system of claim 7, wherein said signal-duration registration device is a computer.

9. The system of claim 1, wherein said device for randomly activating said danger-imitation means is selected from the group consisting of a manually activated switch and a random-number generator that has means for selecting a predetermined time interval during which said danger-imitation means can be randomly switched on.

10. The system of claim 2, wherein said device for randomly activating said danger-imitation means is selected from the group consisting of a manually activated switch and a random-number generator that has means for selecting a predetermined time interval during which said danger-imitation means can be randomly switched on.

11. A method for shortening brake activation reaction time for the driver of a vehicle, wherein the accelerator pedal and the brake pedal are controlled by the foot of the driver who sits in the driver's seat on a seat cushion, said vehicle having at least one brake light on the rear side of said vehicle, said method comprising the steps of:
   a) providing an under-thigh support for the driver's leg having means for preventing sliding of said under-thigh support on the surface of said driver's seat and having a support surface that is raised above the surface of said cushion and is tapered in the direction from the right thigh of the driver toward the center of said driver's seat cushion for supporting the driver's thigh in a position that provides the shortest reaction time for movement of the driver's leg from the accelerator pedal to the brake pedal and for activation of the brake;

b) providing danger-imitation means that generates a danger-imitation signal;

c) providing a first sensor capable of detecting said danger-imitation signal;

d) providing a second sensor capable of detecting a brake light ignited when the driver pushes on the brake;

e) providing a timer capable of counting the time between the generation of said danger-imitation signal and ignition of brake light;

f) providing a registration device for recording said time;

g) placing said under-thigh support into a first position that supports the driver's leg in said position that provides the shortest reaction time for movement of the driver's leg from the accelerator pedal to the brake pedal and for activation of the brake;

h) placing the danger-imitation means into a position visible by the driver from said driver's seat;

i) randomly activating said danger-imitation means;

j) detecting said danger-imitation signal by said first sensor and generating a first signal in response to said danger-imitation signal;

k) detecting ignition of said brake light by said second sensor when the driver pushes on the brake pedal and generating a second signal in response to the ignition of the brake light;

l) measuring said time between the first signal and the second signal;

m) registering said time between the first signal and the second signal by means of said registration device;

n) repeating said steps i) through m) a plurality of times for different positions of said under-thigh support; and o) determining the position of the shortest time between the first signal and the second signal.

12. The method of claim 11, characterized by using said danger-imitation means in the form of a signal lamp that emits a light signal visible by the driver in said position.

13. The method of claim 12, wherein said first sensor is a first photo-receiver and said second sensor is a second photo-receiver.

14. The method of claim 11, further comprising the steps of measuring said time between the first signal and the second signal by means of a switching device that possesses a time-measuring function, carrying out said step of measuring said time between the first signal and the second signal, and switching off said first sensor when said second sensor is switched on.

15. The method of claim 13, further comprising the steps of measuring said time between the first signal and the second signal by means of a switching device that possesses a time-measuring function, carrying out said step of measuring said time between the first signal and the second signal, and switching off said first photo-receiver when said second photo-receiver is switched on.

16. The method of claim 11, wherein said step of randomly activating said danger-imitation means is carried out by a device selected from the group consisting of a manually activated switch and a random-number generator that has means for selecting a predetermined time interval during which said signal lamp can be randomly ignited, wherein said device for randomly activating said danger-imitation means is selected from the group consisting of a manually activated switch and a random-number generator that has means for selecting a predetermined time interval during which said danger-imitation means can be randomly switched on.

* * * * *